(12) United States Patent
Han et al.

(10) Patent No.: US 10,934,612 B2
(45) Date of Patent: Mar. 2, 2021

(54) PREPARATION METHOD AND APPLICATION OF THE MULTICOMPONENT COMPOSITE SULFIDES LUBRICANT FILM

(71) Applicant: CHINA UNIVERSITY OF PETROLEUM (EAST CHINA), Qingdao (CN)

(72) Inventors: Bin Han, Qingdao (CN); Gang Cui, Qingdao (CN); Meiyan Li, Qingdao (CN); Yong Wang, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 16/943,841

(22) Filed: Jul. 30, 2020

(65) Prior Publication Data

US 2020/0362448 A1 Nov. 19, 2020

Related U.S. Application Data

(63) Continuation of application No. PCT/CN2019/105544, filed on Sep. 12, 2019.

(30) Foreign Application Priority Data

Nov. 9, 2018 (CN) .......................... 201811333221.5

(51) Int. Cl.
*C10M 103/06* (2006.01)
*C23C 8/36* (2006.01)
(Continued)

(52) U.S. Cl.
CPC ................ *C23C 8/36* (2013.01); *B22F 1/025* (2013.01); *B22F 9/04* (2013.01); *C10M 103/06* (2013.01);
(Continued)

(58) Field of Classification Search
CPC ... C23C 8/36; C23C 8/08; B22F 1/025; B22F 9/04; B22F 2009/043; C10M 103/06; (Continued)

(56) References Cited

U.S. PATENT DOCUMENTS

2007/0298980 A1* 12/2007 Takayama ............... F16C 23/04
508/103
2018/0223417 A1  8/2018 Lu et al.

FOREIGN PATENT DOCUMENTS

| CN | 102732880 A | 10/2012 |
| CN | 103394685 A | 11/2013 |

(Continued)

*Primary Examiner* — Taiwo Oladapo
(74) *Attorney, Agent, or Firm* — SZDC Law P.C.

(57) ABSTRACT

The invention relates to a multi-component composite sulfide solid lubricating film prepared by sulfurizing the surface of a high-entropy alloy. The high-entropy alloy is composed of five metal elements of Co, Cr, Fe, Ni and Mo or six metal elements of Co, Cr, Fe, Ni, Mo and W. The multi-component composite sulfide solid lubricating film of the invention is mainly applied to the friction pair surface of mechanical equipment, the lubricating film and the sulfurized base have high bonding strength, and multi-component composite sulfide solid lubricating films containing different sulfide lubricating phases can be chose and prepared according to the service environment of equipment.

6 Claims, 8 Drawing Sheets

(51) Int. Cl.
    *B22F 1/02*         (2006.01)
    *B22F 9/04*         (2006.01)
    *C22C 30/00*       (2006.01)
    *C23C 8/08*         (2006.01)
    *C10N 40/20*       (2006.01)
    *C10N 50/08*       (2006.01)

(52) U.S. Cl.
    CPC ................ *C22C 30/00* (2013.01); *C23C 8/08* (2013.01); *B22F 2009/043* (2013.01); *C10M 2201/065* (2013.01); *C10M 2201/084* (2013.01); *C10N 2040/20* (2013.01); *C10N 2050/08* (2013.01)

(58) Field of Classification Search
    CPC ....... C10M 2201/065; C10M 2201/084; C22C 30/00; C10N 2040/20; C10N 2050/08
    See application file for complete search history.

(56) References Cited

FOREIGN PATENT DOCUMENTS

| | | |
|---|---|---|
| CN | 105624515 A | 6/2016 |
| CN | 108048785 A | 5/2018 |
| CN | 108588704 A | 9/2018 |
| CN | 109252162 A | 1/2019 |
| CN | 109487263 A | 3/2019 |

\* cited by examiner

PREPARATION METHOD AND APPLICATION OF THE MULTICOMPONENT COMPOSITE SULFIDES LUBRICANT FILM

This application is a Continuation Application of PCT/CN2019/105544, filed on Sep. 12, 2019, which claims priority to Chinese Patent Application No. 201811333221.5, filed on Nov. 9, 2018, which is incorporated by reference for all purposes as if fully set forth herein.

BACKGROUND OF THE INVENTION

1. Technical Field

The invention relates to the technical field of surface treatment of metal materials, in particular to a multi-component composite sulfide solid lubricating film and a preparation method thereof.

2. Description of Related Art

Wear caused by friction is the main cause of mechanical equipment failure. Currently, about 80% of part equipment damages worldwide are caused by various forms of wear. Therefore, reducing wear and choosing appropriate lubricating materials is the key to improving the use efficiency of equipment. With the development of modern industry, especially aerospace technology and atomic energy industry, mechanical equipment parts are required to work under harsh conditions such as ultra-high temperature, ultra-low temperature, high vacuum, strong radiation, and ultra-high pressure. These harsh conditions have exceeded the operating limits of lubricating oil and grease, and the use of solid lubricating films can effectively reduce the friction coefficient of the friction pair under the above-mentioned harsh conditions, reflecting a better lubrication effect.

The sulfide films, such as FeS, $WS_2$, and $MoS_2$, prepared on the surface of the material by ion sulfurization technology, can effectively avoid direct contact between friction pairs and reduce wear; and FeS, $WS_2$, and $MoS_2$ have a layered hexagonal structure, and the shear strength between layers is low, which can effectively improve the friction and wear resistance of the friction pair material surface. Therefore, they are widely used solid lubricating films at present.

Compared with the single phase solid lubricating film, the composite phase solid lubricating film can concentrate and optimize the advantages of different solid lubricating phases, show a lower friction coefficient and a wider range of application, and become a key way to prepare an ideal lubricating film. Chinese patent CN201110150730.6 discloses a composite sulfide solid lubricating film layer, where laser cladding is combined with low-temperature particle sulfurization technology, Ni-based cermet powder is used to achieve metallurgical bonding with the base, and the formed clad coating is rich in Fe, W and Mo elements. After sulfurization, a composite sulfide solid lubricating film layer is prepared. With small friction coefficient and wear scar depth and compact structure, it has good wear resistance, erosion resistance, and anti-friction lubrication performance. However, its lubricating film layer is thin and uneven, and thus is easily damaged during transportation and storage. Moreover, the combination of the solid lubricating film layer and the clad coating is not tight enough, and it is very easy to cause local layered shedding after long-term use. In addition, the sulfide coating prepared on the surface of the Ni-based cermet is mainly composed of the FeS phase, and very few $WS_2$ phase and the $MoS_2$ phase are obtained, and the advantages of the composite phase solid lubricating film cannot be fully utilized. Moreover, under a high-temperature condition, Ni-based cermet coatings cannot provide effective support for sulfide solid lubricating films. And other high-entropy alloy powders with high temperature resistance and high hardness have the advantages to replace cermet powders.

Domestic researchers use the method of ultrasonic rolling nanometerization to nanometerize the laser clad coating, and then use low-temperature ion sulfurization to prepare a nickel-based sulfide solid lubricating coating with a friction coefficient of 0.45, abrasion loss weight of about 0.80 mg, and its wear resistance has been significantly improved (Tribological Properties of Nickel-based Laser Clad Coating after Nanometerization and Low-temperature Ion Sulfurization, Han Bin, Material Protection, 2015, 48, 5). However, these reports neglect the strength of the material in order to obtain good lubricating properties, so the conditions of use are limited by the strength.

In recent years, Taiwan scholars have provided a new alloy design concept, that is, a high-entropy alloy. The alloy is composed of 5 or more elements, and the atomic fraction of each element is at least greater than 5% but not more than 35%. The solid solution of the traditional concept is characterized by good plastic deformation ability but has low hardness and strength, and can usually only be used as the base phase. The solid solution formed on the basis of the multi-principle high-entropy alloy has high strength and hardness, even higher than the strength of the amorphous alloy, and it also has good thermal stability and wear and corrosion resistance, which provides a wealth of space for the design of new structural materials. At present, there have been many studies to use the beneficial properties of high-entropy alloys to prepare high-entropy alloy clad coatings, which reduces the cost of large parts and meets the application requirements for high strength.

The fast-growing industries, aerospace and other fields have continuously improved the requirements for solid lubricating efficiency, the types of solid lubricating films need to be continuously expanded, and the adaptability of solid lubricating films to harsh working conditions needs to be continuously strengthened. Under this background, higher requirements are placed on the temperature range, load range and friction speed range of the use of the solid lubricating films. Therefore, the preparation of composite lubricating phase solid lubricating film with higher lubrication efficiency, better thermal stability and better corrosion resistance, and simpler preparation process has become the research focus of material scientists.

BRIEF SUMMARY OF THE INVENTION

In view of the problems in the prior art, the objective of the invention is to provide a multi-component composite sulfide solid lubricating film with a simple preparation process, excellent friction reduction and wear resistance, and containing multiple sulfide lubricating phases.

Another objective of the invention is to provide a preparation method of the multi-component composite sulfide solid lubricating film.

In order to achieve the above objectives, the invention adopts the following technical solutions:

A multi-component composite sulfide solid lubricating film prepared by sulfurizing the surface of a high-entropy alloy.

Based on the above solution, the high-entropy alloy is composed of five or more metal elements, and the atomic mole percentage of each element ranges from 5% to 35%.

On the basis of the above solution, the high-entropy alloy is composed of five metal elements of Co, Cr, Fe, Ni and Mo or six metal elements of Co, Cr, Fe, Ni, Mo and W.

On the basis of the above solution, the sulfurizing method is low-temperature ion sulfurization, liquid sulfurization, solid sulfurization or gas sulfurization.

On the basis of the above solution, the plasma sulfurization treatment is carried out at a vacuum degree of 10 tor, a pulse voltage of 550V-700V, a sulfurization temperature of 180° C.-280° C., in the presence of hydrogen sulfide gas as sulfurization gas and hydrogen and argon as protective gas.

On the basis of the above solution, the low-temperature ion sulfurization treatment specifically includes: placing a high-entropy alloy on a cathode tower in an ion sulfurization furnace body, causing the high-entropy alloy to be connected to the cathode of the ion sulfurization furnace and the furnace wall to be connected to the anode, starting a vacuum pump, applying a pulse voltage of 550V-700V between the anode and cathode when the vacuum degree reaches 10 tor, introducing hydrogen and a small amount of argon into the furnace to produce a glow discharge phenomenon, bombarding the surface of the high-entropy alloy near the cathode at a high speed by the obtained hydrogen ions and argon ions; and when the temperature in the furnace reaches 180° C.-280° C., introducing hydrogen sulfide to sulfurize the high-entropy alloy of the cathode, wherein the sulfurization temperature is between 180° C. and 280° C., and the temperature holding time in sulfurization is 2-2.5 hours. The volume ratio of hydrogen sulfide to hydrogen to argon during sulfurization is 30-35:200-240:8-10.

A metal workpiece with high wear resistance, such as: a sliding bearing, a low-speed gearbox gear, a stamping die, a rock drill piston, and a cylinder sleeve, wherein the multi-component composite sulfide solid lubricating film of the invention is attached to the surface of the metal workpiece.

A preparation method of the above workpiece includes the following steps:

(1) mixing a high-entropy alloy metal powder uniformly and then ball milling to a particle size of 300 meshes;

(2) carrying out surface treatment on a base material, and cladding the high-entropy alloy metal powder prepared in step (1) on the surface of the base material by laser cladding technology;

(3) fine grinding and polishing to a surface roughness of 0.4 um; and (4) carrying out the low-temperature ion sulfurization technology for sulfurization treatment.

The multi-component composite sulfide solid lubricating film of the invention is mainly applied to the friction pair surface of mechanical equipment, the lubricating film and the sulfurized base have high bonding strength, and multi-component composite sulfide solid lubricating films containing different sulfide lubricating phases can be chose and prepared according to the service environment of equipment.

The multi-component composite sulfide solid lubricating film of the invention can be applied to the friction reduction and wear resistance of the surfaces of the friction pairs of various types of mechanical equipment under different service conditions, especially suitable for the modification of the surfaces of the friction pairs of precision instruments, and the overall effect is better.

According to the technical solution of the invention, a novel multi-component composite sulfide solid lubricating film is prepared. On one hand, the high-entropy alloy coating contains a variety of sulfide-forming elements, which can provide an elemental basis for the formation of the sulfide lubricating phase during the ion sulfidation process; on the other hand, the laser clad high-entropy alloy coating has high hardness and strong heat and corrosion resistance, plays a favorable supporting role for the lubricating film, and is beneficial to fully exert the anti-friction potential of the solid lubricating film. The high-entropy alloy coating is tightly integrated with the sulfurized coating, which enhances the wear resistance of the solid lubricating film and prevents the localized sulfide shedding of the sulfurized coating. Compared with the solid lubricating film prepared by other methods, the process of preparing the multi-component composite sulfide solid lubricating film by high-entropy alloy laser cladding and ion sulfidation technology is simpler, and can prepare a solid lubricating film containing multiple lubricating phases at the same time, thus achieving better friction reduction and wear resistance and longer service life.

During the preparation of the multi-component composite sulfide solid lubricating film by the laser cladding and the ion sulfidation technology, the element composition of the high-entropy alloy powder can be adjusted reasonably according to the needs of different sulfides. Various metal elements are evenly distributed on the surface of the coating, the coating structure is dense, and the ion sulfurized solid lubricating film obtained on the surface is uniform and dense. Therefore, the solid lubricating film obtained by the invention shows good stability and excellent friction reduction and wear resistance in friction experiments.

The invention uses the ion sulfurization technology to prepare a multi-component composite sulfide solid lubricating film on the surface of a high-entropy alloy. The sulfurization temperature is low, which avoids the effect of high-temperature heat treatment on the workpiece, the workpiece has no thermal deformation, and the thickness of the prepared solid lubricating film is only 3-5 μm. Therefore, the anti-friction and wear-resistant treatment of the surface of the precision-matched friction pair workpiece is particularly effective.

BRIEF DESCRIPTION OF THE SEVERAL VIEWS OF THE DRAWINGS

where 1—preplaced high—entropy alloy powder 2—protective gas 3—laser head 4—laser beam 5—high-entropy alloy coating 6—base material.

where 1—control cabinet 2—voltage control system 3—gasket 4—cathode tower 5—anode plate 6—furnace body 7—temperature sensor 8—vacuum pump 9—gas control valve 10—hydrogen 11—argon 12—hydrogen sulfide 13—vacuum tester.

DETAILED DESCRIPTION OF THE INVENTION

The above-mentioned contents of the invention will be further described in detail through the specific implementation solutions provided in the following embodiments. Those skilled in the art should understand that the scope of the above-mentioned subject matter of the invention is limited to the following embodiments. Any technology implemented on the basis of the above-mentioned contents of the invention belongs to the scope of the invention.

The experimental methods adopted in the following embodiments, unless otherwise specified, are conventional methods; the reagents, materials, instruments and the like used in the following embodiments, if not specifically stated, are commercially available.

I. Processing equipment and material sources used in the application examples of the invention:

1. The laser cladding equipment is a DL-5 kW cross-flow carbon dioxide laser produced by Shenyang Dalu Laser Group. Different types of laser processing equipment produced by other manufacturers can also be applied to the invention. The invention focuses on a process method for preparing a multi-component composite sulfide solid lubricating film, and there is no special requirement for the equipment.

Figure 1:
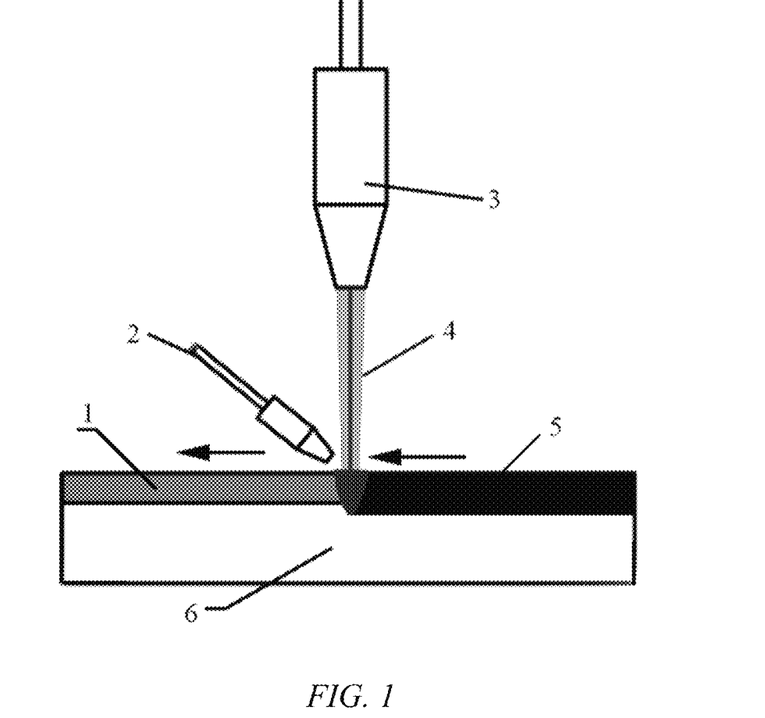
FIG. 1 is a schematic diagram of laser cladding with preset powder spreading.

FIG. 1 shows a schematic diagram of the laser processing equipment. This application example uses the preplaced-powder laser cladding, that is, the high-entropy alloy powder is preplaced on the surface of the base material, and the powder is irradiated with the laser beam. Under the action of a high-energy laser beam, the alloy powder and the surface coating of the base material are partially melted and fused. Due to the flow of the molten pool, different metal elements are evenly distributed in the coating. As the laser beam moves, the molten metal quickly solidifies and achieves metallurgical bonding with the surface of the base material. The composition of the laser cladding powder can be adjusted reasonably according to actual needs. The laser cladding power, scanning speed, and lap rate can be optimized according to different experimental requirements, and the laser clad high-entropy alloy coating that meets the requirements is finally obtained.

2. The ion sulfurization equipment is the LDMC-15A multifunctional ion chemical heat treatment furnace developed by Wuhan Shoufa Environmental Protection Equipment Co., Ltd. It uses hydrogen sulfide with a purity of 99.9% as the reaction gas, and hydrogen and argon as auxiliary gases.

Figure 2:
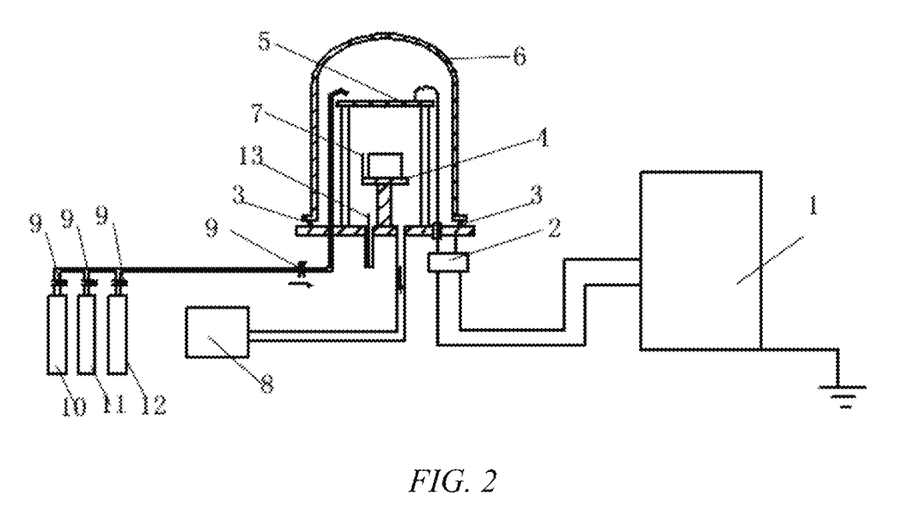
FIG. 2 is a schematic diagram of low-temperature ion sulfurization equipment.

As shown in FIG. 2, it is a schematic diagram of low-temperature ion sulfurization treatment equipment in the preparation process of a multi-component composite sulfide solid lubricating film described in the following application examples. The temperature of low temperature ion sulfidation is controlled between 180° C. and 280° C., which is much lower than the temperature of 600° C.-700° C. used in ordinary sulfidation technology. As shown in FIG. 2, the control cabinet 1 and the voltage control system 2 are used to regulate the pulse voltage applied across the anode and cathode; the thermal sensor can measure the temperature of the clad coating on the cathode tower in real time and convert it into an electrical signal to output to the control cabinet; the hydrogen, argon, and hydrogen sulfide in gas cylinders 10, 11, and 12 respectively pass through the gas control valve 9 and then enter the sulfurization furnace body 6 through pipes; the sulfurized samples are placed on the cathode tower 4; the vacuum degree inside the furnace body is controlled through the vacuum pump 8 and the vacuum degree tester 13.

The base material used in the application example of the invention is Q235 steel, and the metal powder is pure metal powder with a purity of 99.9% and a particle size of 300 meshes produced by Nangong Yingtai Metal Material Co., Ltd.

The comparative material high-entropy alloy coating and FeS film used in this application example are all prepared by laser cladding and ion sulfurization technology, which are all existing technologies.

II. Method and equipment used for measuring the bonding strength between the solid lubricating film and the sulfurized base in the application example of the invention In the examples of the invention, the "scratch method" is used to measure the bonding strength between the ion sulfurized coating and the laser clad coating. The measurement equipment uses the nano scratch instrument developed by the Lanzhou Institute of Physical Chemistry of the Chinese Academy of Sciences. A smooth scriber is used to scribe the surface of the film obtained by ion sulfurization. When the film is detached from the base, the friction coefficient between the scriber and the contact surface increases, and at this time, the increase rate of the frictional force will change suddenly. Therefore, the load applied when the increase rate of the frictional force changes significantly is the critical load, which is the bonding strength between the sulfide film and the clad coating base. During the test, the pressure loading range is 0-50 N, the loading speed is 50 N/min, and the scratch length is 5 mm.

3. The tribological property test method and equipment used under dry friction conditions in the application examples of the invention Under dry friction conditions, the "ball-disk" friction test is used to test the tribological properties of the application examples of the invention. The friction property test equipment uses the WTM-2E type controlled environmental ball-disk friction and wear tester developed by the Institute of Physical Chemistry of the Chinese Academy of Sciences in Lanzhou. The GCr15 steel ball with a diameter of Φ6 mm and hardness of HRC65 is used in sample loading. The lower samples are Q235 steel, high-entropy alloy coating, and a high-entropy alloy coating with FeS film, FeS/WS$_2$ film and various sulfide solid lubricating films prepared on the surface, with a diameter of 40 mm and a thickness of 6 mm. During the experiment, the upper sample is fixed and the lower sample is fixed on the disc sample table. During the experiment, the disc rotates with a friction diameter of 12 mm, a friction speed of 0.2 m/s, and a fixed load of 5 N. The experiment is carried out under dry friction conditions, the experiment temperature is 25° C.-35° C., the air humidity for the experiment is 60%-75%, and the experiment time is 1 hour. The friction coefficient is automatically collected by the test system that comes with the tester. The sample is fully ultrasonic cleaned before and after wear and weighed using a FA2204 electronic balance with an accuracy of ±0.1 mg. The weight loss before and after wear is used as the wear loss. The average value of three experiments is regarded as the weight loss.

Example 1. Preparation of $FeS/MoS_2$ Composite Sulfide Solid Lubricating Film (1) According to the type of sulfides (FeS and $MoS_2$) contained in the solid lubricating film to be prepared, the laser clad high-entropy alloy powder containing Fe and Mo elements was designed. In order to ensure the hardness and corrosion resistance of the clad coating, CoCrFeNiMo alloy powder was chose and prepared.

(2) The powder material used Co, Cr, Fe, Ni, and Mo metal powder with a purity of 99.9%, was weighed according to equimolar ratio, uniformly mixed, ball milled for 2 hours using a ball mill, and then screened with a 300 mesh metal sieve.

(3) The surface of Q235 base steel was polished and cleaned to remove oxide scale and oil stains.

(4) The laser cladding technology was carried out on the powder obtained in step (2) to prepare the laser clad CoCrFeNiMo high-entropy alloy coating on the surface of the base material obtained in step (3). By changing the laser cladding power and scanning speed, the high-entropy alloy coating in line with the use requirement was obtained. Specifically, the high-entropy alloy coating is prepared by laser cladding on the surface of the base material using the preplaced-powder method, the preplaced-powder thickness is 1 mm, the laser beam adopts a 10 mm×1 mm rectangular spot, and the multi-pass cladding overlap rate is 30%, the laser cladding power is 2800 W, and the scanning speed is 150 mm/min.

(5) The coating obtained in step (4) is subjected to fine grinding and polishing treatment, and the surface roughness is 0.4 μm.

(6) the low-temperature ion sulfurization is carried out on the coating obtained in step (5). The high-entropy alloy coating was placed on a cathode tower in an ion sulfurization furnace body, the sample was connected to the cathode of the ion sulfurization furnace and the furnace wall was connected to the anode, a vacuum pump was started, a pulse voltage of 640V was applied between the anode and cathode when the vacuum degree reached 10 tor, hydrogen and a small amount of argon were introduced into the furnace to produce a glow discharge phenomenon, and the obtained hydrogen ions and argon ions bombarded the surface of the CoCrFeNiMo high-entropy alloy coating near the cathode at a high speed; and when the temperature in the furnace reached 250° C., hydrogen sulfide was introduced to sulfurize the high-entropy alloy coating of the cathode at 250° C., wherein the temperature holding time in sulfurization was 2.5 hours; the volume ratio of hydrogen sulfide to hydrogen to argon was 30:200:10. The temperature holding time in sulfurization refers to the temperature holding time after hydrogen sulfide gas was introduced; the thickness of the finally prepared $FeS/MoS_2$ composite sulfide solid lubricating film was 3.4 μm.

Figure 3A:
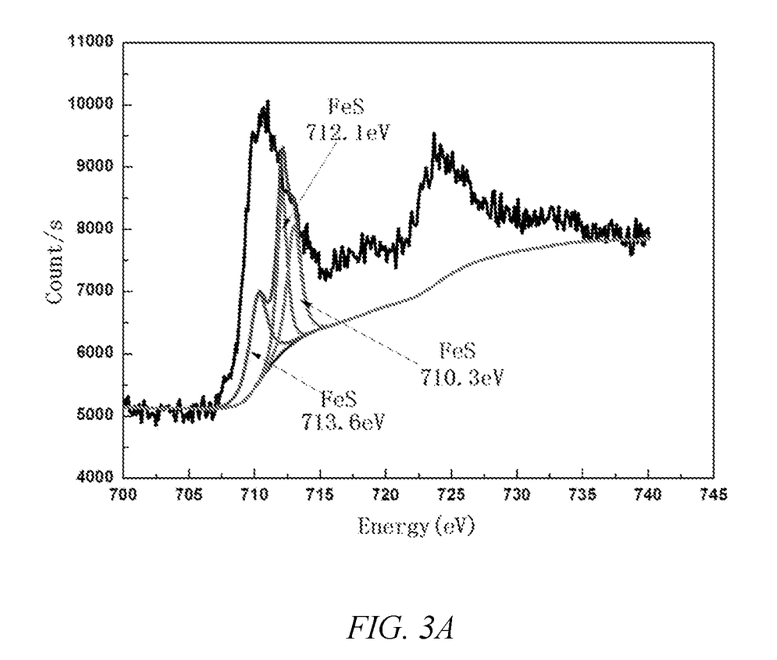
FIGS. 3A, 3B, and 3C show the X-ray photoelectron spectroscopy analysis results of the valence states of (a) Fe, (b) Mo, and (c) S elements in the ion sulfurized coating on the surface of CoCrFeNiMo high-entropy alloy coating.
Figure 3B:
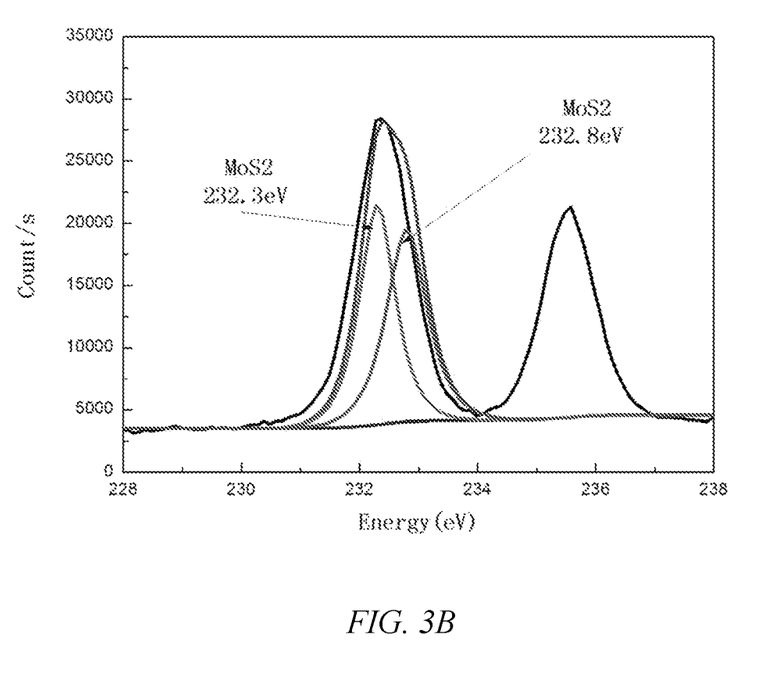
Figure 3C:
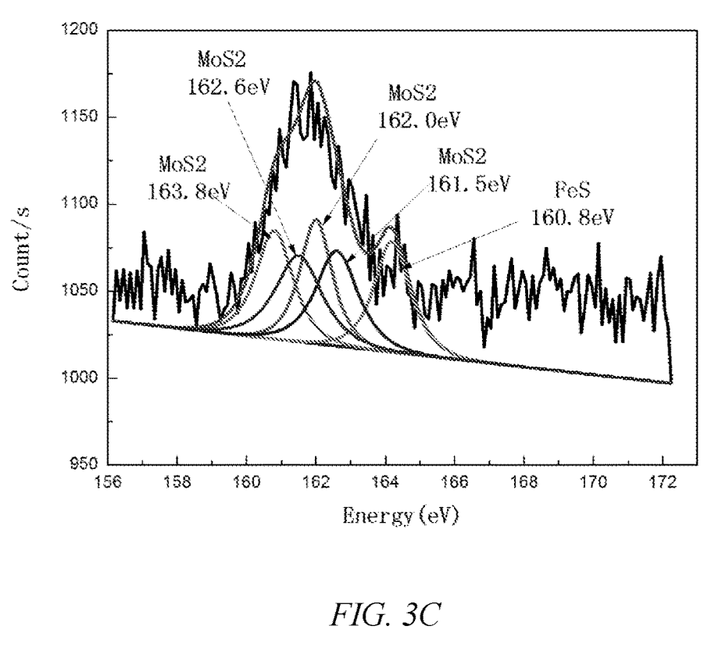

X-Ray Photoelectron Spectroscopy Analysis:

FIGS. 3A, 3B, and 3C show the results of X-ray photoelectron spectroscopy analysis of the elements Fe, Mo, and S on the surface of the sulfide solid lubricating film prepared in Example 1, respectively. It can be seen that the Fe element has higher diffraction peaks at 713.6 eV, 712.6 eV, and 710.3 eV, and in combination with the standard spectrum, it can be seen that the form of the Fe element is mainly FeS in this case; the Mo element has higher diffraction peaks at 232.8 eV and 232.3 eV; in comparison with the standard spectrum, it can be seen that the Mo element is mainly in the form of $MoS_2$ in this case; the S element shows peaks at 163.8 eV, 162.6 eV, 162.0 eV, 161.5 eV, and 160.8 eV, and in combination with the previous analysis and standard spectrum, it can be seen that the main forms of the S element in this case are FeS and $MoS_2$. Therefore, it can be determined that both the solid lubricating phase FeS and the solid lubricating phase $MoS_2$ are obtained in the ion-sulfurized coating on the surface of the CoCrFeNiMo high-entropy alloy.

Effect Test:

The tribological properties of the CoCrFeNiMo high-entropy alloy coating and the CoCrFeNiSi high-entropy alloy coating and the FeS lubricating film prepared on the surface and the $FeS/MoS_2$ composite sulfide solid lubricating film prepared in Application Example 1 were compared under dry friction conditions.

Figure 4:
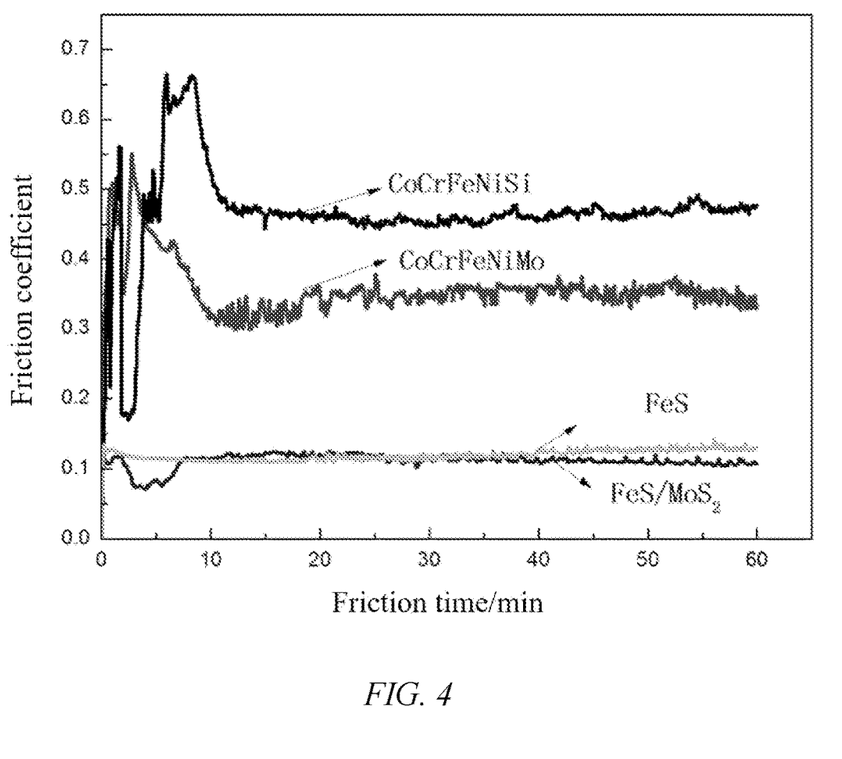
FIG. 4 is a time-varying curve of friction coefficient of CoCrFeNiMo and CoCrFeNiSi coatings and FeS/$MoS_2$ and FeS films under dry friction.

Test results: As shown in FIG. 4, it is a time-varying curve of the friction coefficients of the CoCrFeNiMo and CoCrFeNiSi high-entropy alloy coatings, the FeS film and the $FeS/MoS_2$ composite sulfide solid lubricating film. The hardnesses of the two high-entropy alloy coatings, CoCrFeNiMo high-entropy alloy coating and CoCrFeNiSi high-entropy alloy coating, prepared in Example 1 are close and are HRC55.6 and HRC56.0, respectively.

Figure 5:
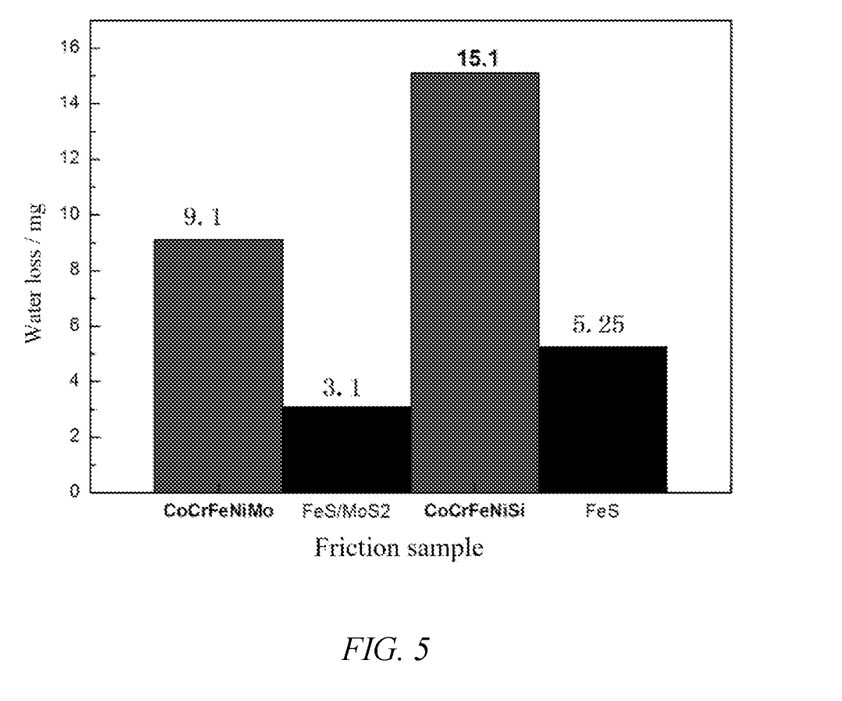
FIG. 5 is a comparison of the wear loss of CoCrFeNiMo and CoCrFeNiSi coating and FeS/$MoS_2$ and FeS film samples under the same friction condition.

FIG. 5 is a comparison chart of the wear loss of the CoCrFeNiMo and CoCrFeNiSi high-entropy alloy coating, the FeS film, and the $FeS/MoS_2$ composite sulfide solid lubricating film under dry friction conditions.

It can be seen from FIG. 4 that the friction coefficient of the $FeS/MoS_2$ composite sulfide solid lubricating film is lowest and very stable. During the friction process, the friction coefficient of the $FeS/MoS_2$ composite sulfide solid lubricating film is lower than that of the CoCrFeNiMo and CoCrFeNiSi high-entropy alloy coatings and the FeS film and has always been in a stable state, indicating that the $FeS/MoS_2$ composite sulfide solid lubricating film prepared by this application example has good and stable lubricating performance.

It can be seen from FIG. 5 that $FeS/MoS_2$ composite sulfide solid lubricating film has the lowest friction loss. It shows that the $FeS/MoS_2$ composite sulfide solid lubricating film prepared by this application example has the longest friction and wear life under the same service conditions.

In summary, the $FeS/MoS_2$ composite sulfide solid lubricating film prepared by the invention has excellent lubricating performance under dry friction conditions. Therefore, the $FeS/MoS_2$ composite sulfide solid lubricating film has more outstanding lubricating performance than that of the high-entropy alloy coating before sulfurization and the FeS single-phase solid lubricating film on the surface of the high-entropy alloy coating and has stable and excellent friction reduction and wear resistance.

Figure 6:
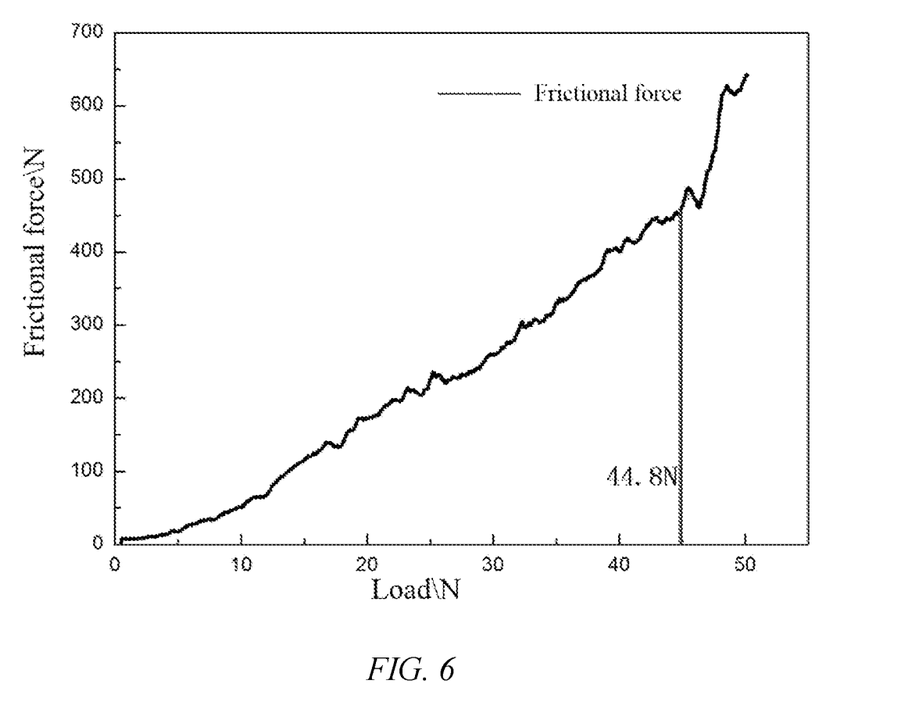
FIG. 6 is a test curve of the bonding strength between the FeS/MoS$_2$ solid lubricating film and the sulfurized base CoCrFeNiMo coating.
Figure 7A:
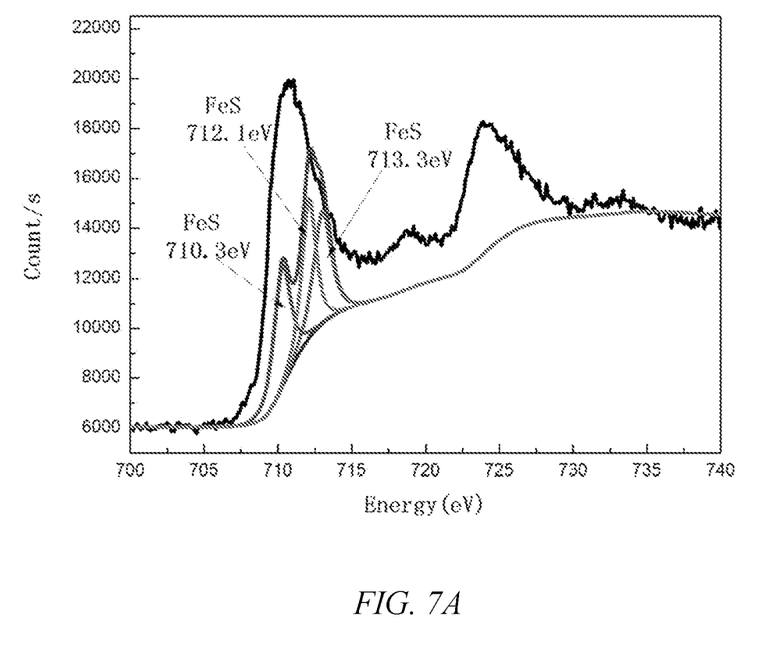
FIGS. 7A, 7B, 7C, and 7D show the X-ray photoelectron spectroscopy analysis results of the valence states of (a) Fe, (b) Mo, (c) W and (d) S elements in the ion sulfurized coating on the surface of CoCrFeNiMoW high-entropy alloy coating.
Figure 7B:
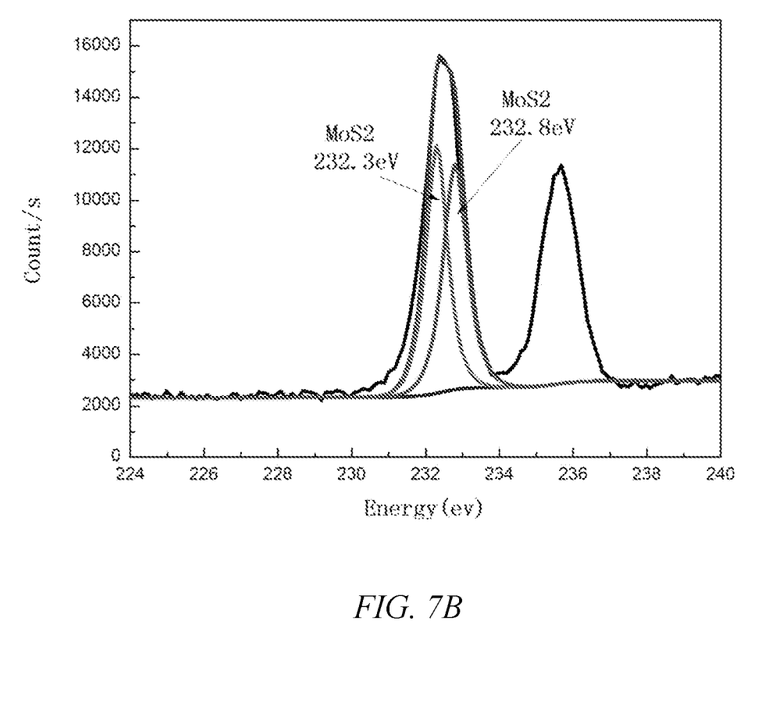
Figure 7C:
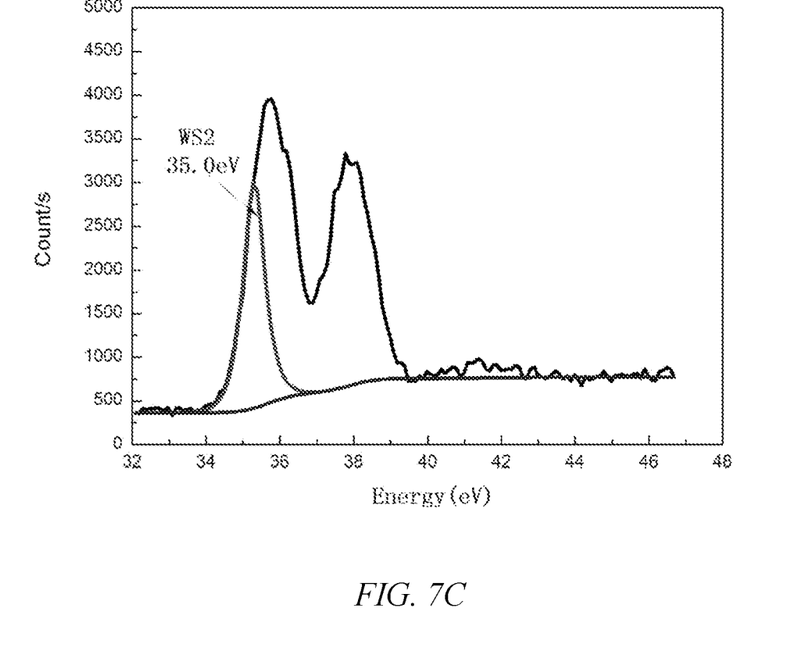
Figure 7D:
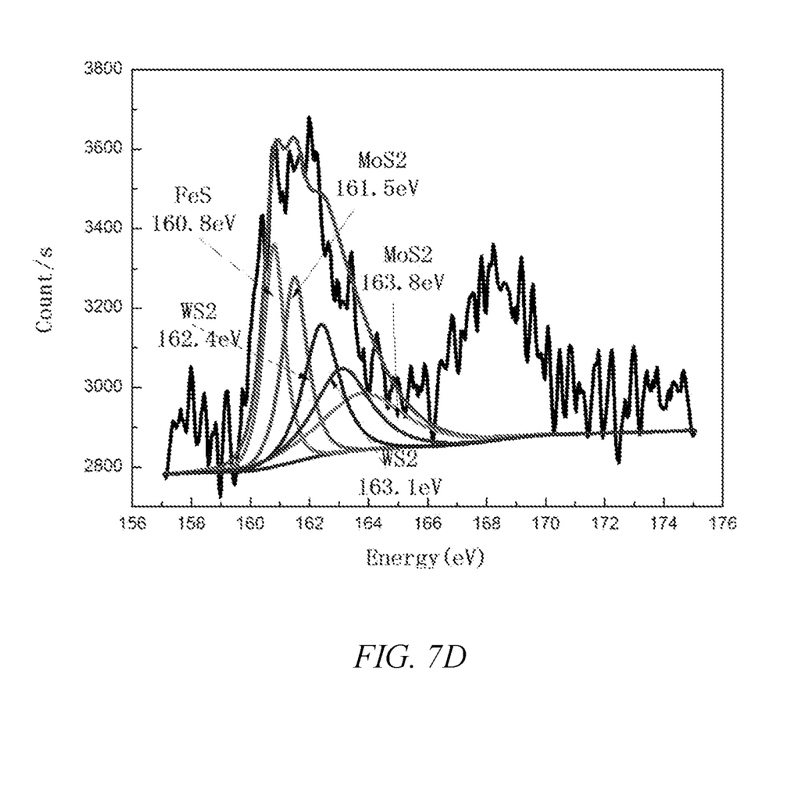

Bonding Strength Test:

The bonding strength between the FeS/MoS$_2$ composite sulfide solid lubricating film and the surface of the CoCrFeNiMo high-entropy alloy coating was tested. The test results are shown in FIG. 6. It can be seen from the figure that when the load applied reaches 44.8 N, the increase rate of the frictional force suddenly increases, indicating that the composite solid lubricating film just separates from the clad coating base at this time. The magnitude of the load applied at this time is the bonding strength (44.8 N) between the solid lubricating film and the sulfurized base. According to the evaluation criteria on the bonding strength of surface coatings shown in Table 1, the FeS/MoS$_2$ composite sulfide solid lubricating film has excellent bonding strength with the high-entropy alloy coating, which has a positive effect on the performance of its friction reduction and wear resistance in practical applications.

TABLE 1

Qualitative evaluation criteria on bonding strength

| Bonding strength (N) | 0-10 | 10-25 | 25-40 | 40-60 | 60-80 | 80-100 | >100 |
|---|---|---|---|---|---|---|---|
| Qualitative evaluation | Worse | Poor | General | Good | Better | Best | Metallurgical bonding |

Example 2. Preparation of FeS/MoS$_2$/WS$_2$ Composite Sulfide Solid Lubricating Film (1) According to the type of sulfides (FeS, MoS$_2$, and MoS$_2$) contained in the solid lubricating film to be prepared, the laser clad high-entropy alloy powder containing Fe, Mo and W elements was designed. In order to ensure the hardness and corrosion resistance of the clad coating, CoCrFeNiMoW alloy powder was chose and prepared.

(2) The powder material used Co, Cr, Fe, Ni, Mo and W metal powder with a purity of 99.9%, was weighed according to equimolar ratio, uniformly mixed, ball milled for 2 hours using a ball mill, and then screened with a 300-mesh metal sieve.

(3) The surface of Q235 base steel was polished and cleaned to remove oxide scale and oil stains.

(4) The laser cladding technology was carried out on the powder obtained in step (2) to prepare the laser clad CoCrFeNiMoW high-entropy alloy coating on the surface of the base material obtained in step (3). Specifically, the high-entropy alloy coating is prepared by laser cladding on the surface of the base material using the preplaced-powder method, the preplaced-powder thickness is 1 mm, the laser beam adopts a 10 mm×1 mm rectangular spot, and the multi-pass cladding overlap rate is 30%, the laser cladding power is 3100 W, and the scanning speed is 150 mm/min.

(5) The coating obtained in step (4) is subjected to fine grinding and polishing treatment, and the surface roughness is 0.4 μm.

(6) the low-temperature ion sulfurization is carried out on the coating obtained in step (5).

The high-entropy alloy coating was placed on a cathode tower in an ion sulfurization furnace body, the sample was connected to the cathode and the furnace wall was connected to the anode, a vacuum pump was started, a pulse voltage of 640V was applied between the anode and cathode when the vacuum degree reached 10 tor, hydrogen and a small amount of argon were introduced into the furnace to produce a glow discharge phenomenon, and the obtained hydrogen ions and argon ions bombarded the surface of the CoCrFeNiMoW high-entropy alloy coating near the cathode at a high speed; and when the temperature in the furnace reached 250° C., hydrogen sulfide was introduced to ion sulfurize the high-entropy alloy coating of the cathode at 250° C., wherein the temperature holding time in sulfurization was 2.5 hours; the volume ratio of hydrogen sulfide to hydrogen to argon in sulfurization was 30:200:10. The temperature holding time in sulfurization refers to the temperature holding time after hydrogen sulfide gas was introduced; the thickness of the finally prepared FeS/MoS$_2$ composite sulfide solid lubricating film was 3.6 μm.

X-Ray Photoelectron Spectroscopy Analysis:

FIGS. 7A, 7B, 7C, and 7D show the results of X-ray photoelectron spectroscopy analysis of the elements Fe, Mo, W and S on the surface of the ion sulfurized coating prepared in Application example 2. It can be seen that the Fe element has higher diffraction peaks at 713.6 eV, 712.1 eV, and 710.3 eV, and in comparison with the standard spectrum, it can be seen that the form of the Fe element is mainly FeS in this case; the Mo element has higher diffraction peaks at 232.3 eV and 232.8 eV, and in comparison with the standard spectrum, it can be seen that the Mo element is mainly in the form of MoS$_2$ in this case; the diffraction peak of the W element is higher at 35.0 eV, and in combination with the standard spectrum, it can be seen that the W element is mainly in the form of WS$_2$ in this case; the S element has higher diffraction peaks at 162.4 eV, 160.8 eV, 161.5 eV, 163.8 eV, and 163.1 eV, and in comparison with the previous analysis and standard spectrum, it can be seen that the main forms of the S element are FeS, MoS$_2$ and WS$_2$. Therefore, it can be determined that FeS, MoS$_2$ and WS$_2$ solid lubricating phases were successfully prepared in the ion sulfurized coating on the CoCrFeNiMoW high-entropy alloy coating surface.

Effect Test:

The tribological properties of the CoCrFeNiMoW high-entropy alloy coating and the CoCrFeNiW high-entropy alloy coating and the FeS/WS$_2$ lubricating film prepared on the surface are compared with the tribological properties of the FeS/MoS$_2$/WS$_2$ composite sulfide solid lubricating film prepared in Application Example 2 under dry friction conditions.

Figure 8:
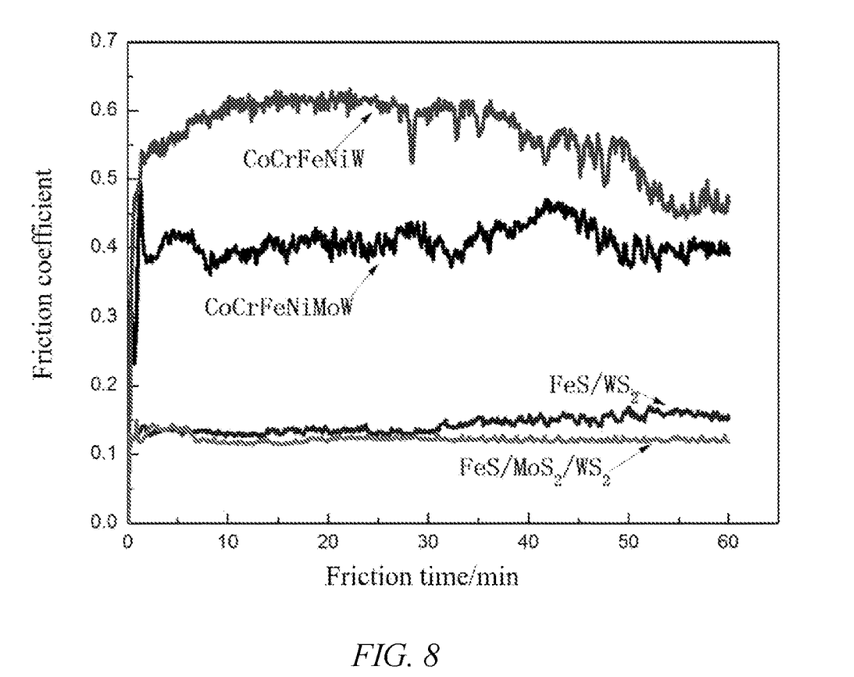
FIG. 8 is the time-varying curve of friction coefficient of CoCrFeNiMoW and CoCrFeNiW coatings and FeS/WS$_2$ and FeS/MoS$_2$/WS$_2$ films under dry friction.

Test results: FIG. 8 is the time-varying curve of friction coefficient of CoCrFeNiMoW and CoCrFeNiW high-entropy alloy coatings and FeS/WS$_2$, FeS/MoS$_2$/WS$_2$ composite sulfide solid lubricating film under dry friction conditions; where, the surface hardnesses of the clad coatings are close and are HRC55.2 and HRC56.0, respectively.

Figure 9:
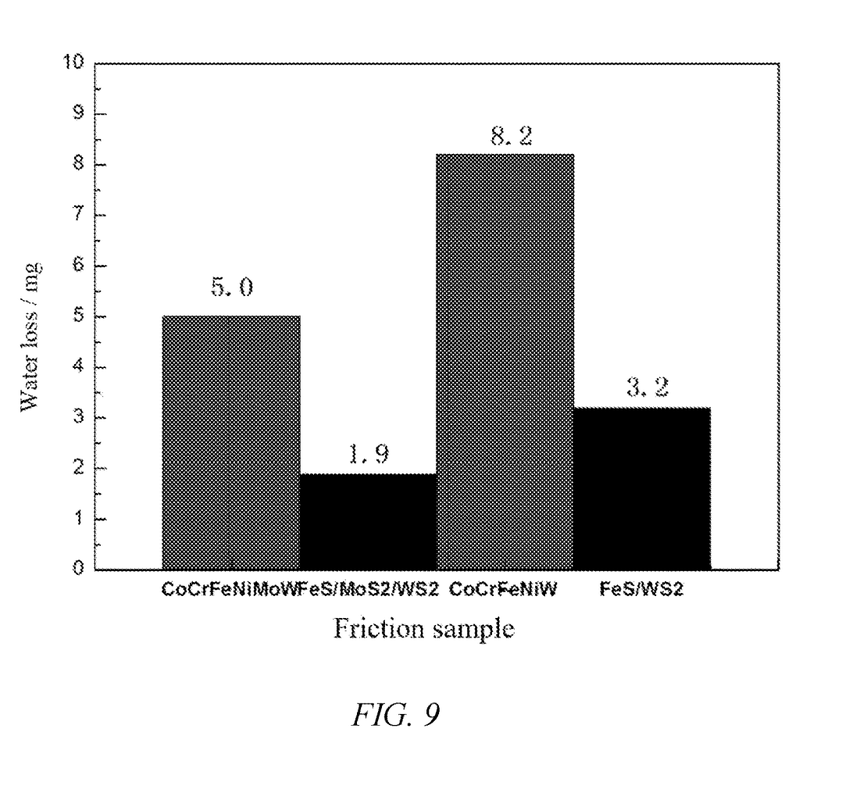
FIG. 9 is a comparison of the wear loss of CoCrFeNiMoW and CoCrFeNiW coating and FeS/WS$_2$ and FeS/MoS$_2$/WS$_2$ film samples under the same friction condition.

FIG. 9 is a comparison chart of the wear loss of the CoCrFeNiMoW and CoCrFeNiSi high-entropy alloy coatings, the FeS/WS$_2$ and FeS/MoS$_2$/WS$_2$ composite sulfide solid lubricating films under dry friction conditions.

It can be seen from FIG. 8 that the friction coefficient of the FeS/MoS$_2$/WS$_2$ composite sulfide solid lubricating film is lowest and very stable. During the whole friction process, the friction coefficient of the FeS/MoS$_2$/WS$_2$ composite sulfide solid lubricating film is always lower than that of the CoCrFeNiMoW high-entropy alloy coatings and the FeS/WS$_2$ film and has always been in a stable state, indicating that the FeS/MoS$_2$/WS$_2$ composite sulfide solid lubricating film prepared by this application example has good and stable lubricating performance as compared with other coatings.

It can be seen from FIG. 9 that FeS/MoS$_2$/WS$_2$ composite sulfide solid lubricating film has the lowest friction loss. It shows that the FeS/MoS$_2$/WS$_2$ composite sulfide solid lubricating film prepared by this application example and its friction pair have the longest friction and wear life under the same service conditions.

In summary, the FeS/MoS$_2$/WS$_2$ composite sulfide solid lubricating film prepared by the invention has excellent lubricating performance under dry friction conditions, and with stable and excellent friction reduction and wear resistance. Therefore, the FeS/MoS$_2$/WS$_2$ composite sulfide solid lubricating film has more outstanding lubricating performance than that before vulcanization and that of other films, and has stable and excellent friction reduction and wear resistance.

Figure 10:
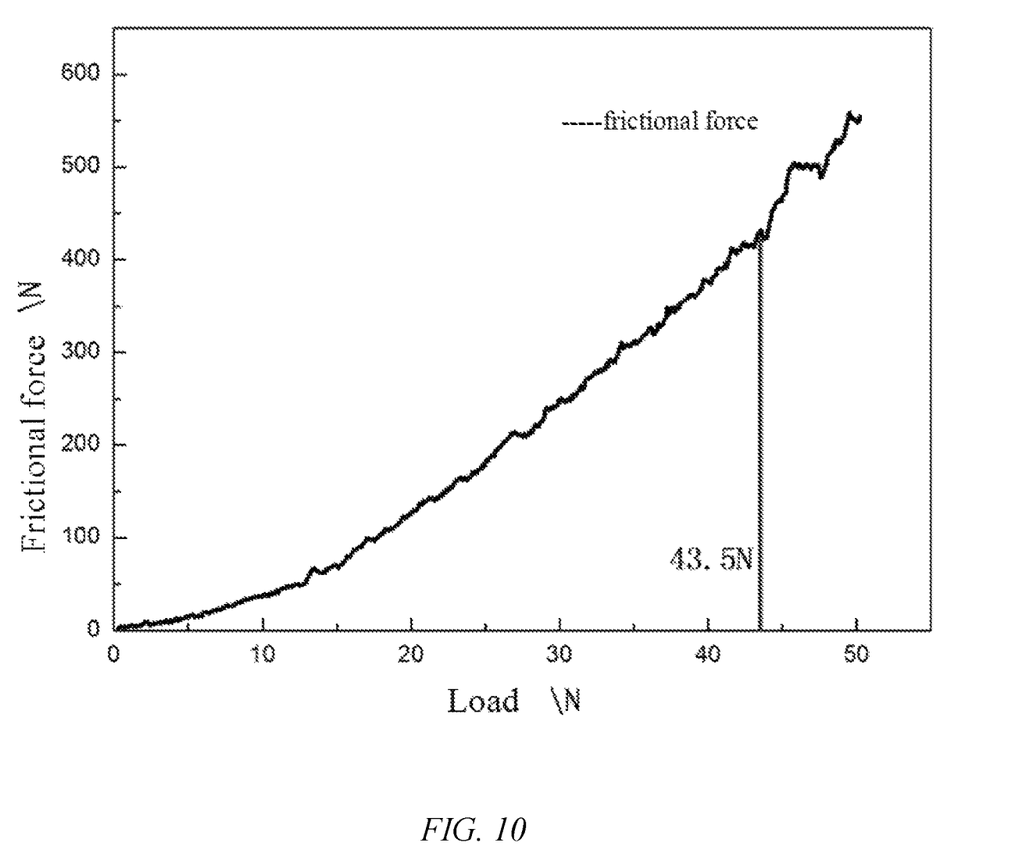
FIG. 10 is the test curve of the bonding strength between FeS/MoS$_2$/WS$_2$ and the sulphurized base CoCrFeNiMoW coating.

Bonding Strength Test:

The bonding strength between the FeS/MoS$_2$/WS$_2$ composite sulfide solid lubricating film and the CoCrFeNiMoW high-entropy alloy coating surface was tested. The test results are shown in FIG. 10. It can be seen from the figure that when the load applied reaches 43.5 N, the increase rate of the frictional force suddenly increases, indicating that the composite solid lubricating film just separates from the clad coating base at this time. The magnitude of the load applied at this time is the bonding strength (43.5 N) between the solid lubricating film and the sulfurized base. According to the evaluation criteria on the bonding strength of surface coatings shown in Table 1, the FeS/MoS$_2$/WS$_2$ composite sulfide solid lubricating film has excellent bonding strength with the high-entropy alloy coating, which has a positive effect on the performance of its friction reduction and wear resistance in practical applications.

The above descriptions are only preferred embodiments of the invention, and are not intended to limit the invention in other forms. Any person familiar with the profession may use the technical content disclosed above to change or modify them into the equivalent embodiments of equivalent changes. However, any simple modifications, equivalent changes and modifications made to the above embodiments based on the technical essence of the invention without departing from the content of the technical solutions of the invention still belong to the protection scope of the technical solution of the invention.

What is claimed is:

1. A multi-component composite sulfide solid lubricating film prepared by sulfurizing the surface of an alloy, wherein
   the alloy consists of five metal elements of Co, Cr, Fe, Ni and Mo or six metal elements of Co, Cr, Fe, Ni, Mo and W, and the atomic mole percentage of each element ranges from 5% to 35%;
   the sulfurizing method is a low-temperature ion sulfurization, and the low-temperature ion sulfurization is carried out at a vacuum degree of 10 tor, a pulse voltage of 550V-700V, a sulfurization temperature of 180° C.-280° C., in the presence of hydrogen sulfide gas as sulfurization gas and hydrogen and argon as protective gas; and
   the thickness of the multi-component composite sulfide solid lubricating film is 3-5 μm.

2. The multi-component composite sulfide solid lubricating film according to claim 1, wherein the low-temperature ion sulfurization treatment specifically comprises: placing the alloy on a cathode tower in an ion sulfurization furnace body, allowing the alloy to be connected to a cathode of the ion sulfurization furnace and a furnace wall to be connected to an anode, starting a vacuum pump, applying a pulse voltage of 550V-700V between the anode and cathode when the vacuum degree reaches 10 tor, introducing hydrogen and a small amount of argon into the furnace to produce a glow discharge phenomenon, bombarding the surface of the alloy near the cathode at a high speed by the obtained hydrogen ions and argon ions; and when the sulfurization temperature is between 180° C. and 280° C., and the temperature in the furnace reaches 180° C.-280° C., introducing hydrogen sulfide to sulfurize the alloy of the cathode, wherein the temperature holding time in sulfurization is for 2-2.5 hours.

3. A metal workpiece with high wear resistance, wherein the multi-component composite sulfide solid lubricating film according to claim 1 is attached to the surface of the metal workpiece.

4. The metal workpiece with high wear resistance according to claim 3, wherein the metal workpiece is a sliding bearing, a low-speed gearbox gear, a stamping die, a rock drill piston, or a cylinder sleeve.

5. A preparation method of the metal workpiece with high wear resistance according to claim 3, comprising the following steps: (1) mixing the alloy metal powder uniformly and then ball milling to a particle size of 300 meshes; (2) carrying out surface treatment on a base material, and cladding the alloy metal powder prepared in step (1) on the surface of the base material by laser cladding technology; (3) fine grinding and polishing to a surface roughness of 0.4 um; and (4) carrying out the low-temperature ion sulfurization technology for sulfurization treatment.

6. The method according to claim 5, wherein the low-temperature ion sulfurization treatment specifically comprises: placing the alloy on a cathode tower in an ion sulfurization furnace body, allowing the alloy to be connected to a cathode of the ion sulfurization furnace and a furnace wall to be connected to an anode, starting a vacuum pump, applying a pulse voltage of 550V-700V between the anode and cathode when the vacuum degree reaches 10tor, introducing hydrogen and a small amount of argon into the furnace to produce a glow discharge phenomenon, bombarding the surface of the alloy near the cathode at a high speed by the obtained hydrogen ions and argon ions; and
   when the temperature in the furnace reaches 180° C. -280° C., introducing hydrogen sulfide to sulfurize the alloy of the cathode, wherein the sulfurization temperature is between 180° C. and 280° C., and the temperature holding time in sulfurization is 2-2.5 hours.

* * * * *